United States Patent
Jean et al.

(10) Patent No.: US 12,109,952 B2
(45) Date of Patent: Oct. 8, 2024

(54) ACOUSTIC SHIELD FOR MOTOR VEHICLE ENGINE

(71) Applicant: NOVARES FRANCE, Clamart (FR)

(72) Inventors: Thomas Jean, Houdain (FR); Daniel Darcel, Paris (FR)

(73) Assignee: NOVARES FRANCE, Clamart (FR)

( * ) Notice: Subject to any disclaimer, the term of this patent is extended or adjusted under 35 U.S.C. 154(b) by 0 days.

(21) Appl. No.: 17/642,006

(22) PCT Filed: Sep. 18, 2020

(86) PCT No.: PCT/FR2020/051627
§ 371 (c)(1),
(2) Date: Mar. 10, 2022

(87) PCT Pub. No.: WO2021/053308
PCT Pub. Date: Mar. 25, 2021

(65) Prior Publication Data
US 2024/0042948 A1    Feb. 8, 2024

(30) Foreign Application Priority Data

Sep. 18, 2019 (FR) .................................. 19/10293

(51) Int. Cl.
*B60R 13/08* (2006.01)
*B60R 21/34* (2011.01)

(52) U.S. Cl.
CPC .......... *B60R 13/0838* (2013.01); *B60R 21/34* (2013.01); *B60R 2021/343* (2013.01)

(58) Field of Classification Search
CPC ................ B60R 13/0838; B60R 21/34; B60R 2021/343
(Continued)

(56) References Cited

U.S. PATENT DOCUMENTS 5,706,908 A * 1/1998 Sakai ...................... B60R 21/34
180/69.2
2006/0073310 A1 * 4/2006 Winkler .................. F02B 77/13
428/158
(Continued)

FOREIGN PATENT DOCUMENTS

EP    1925511 A1    5/2008
EP    2089251 A1    8/2009
(Continued)

OTHER PUBLICATIONS

International Search Report issued Jan. 19, 2021 re: Application No. PCT/FR2020/051627, pp. 1-3.

*Primary Examiner* — Yi-Kai Wang
(74) *Attorney, Agent, or Firm* — CANTOR COLBURN LLP

(57) ABSTRACT

An acoustic shield for a motor vehicle engine (2), including a first portion made of a plastic material, the first portion having an element for attaching the shield to a motor vehicle engine, a second portion made at least partially of a sound-absorbent material. The second portion is intended for being placed in contact with the engine, wherein the first portion covers the second portion so as to at least partially conceal it and wherein the first portion has a central opening acting as a housing for a third portion. The third portion is configured to absorb the impacts transmitted by the motor vehicle bonnet during a pedestrian impact.

16 Claims, 4 Drawing Sheets

(58) Field of Classification Search
USPC .......................................................... 181/284
See application file for complete search history.

(56) References Cited

U.S. PATENT DOCUMENTS

2010/0143661 A1    6/2010  Warrick
2019/0107078 A1*  4/2019  Nola ................... B60R 13/0838

FOREIGN PATENT DOCUMENTS

| FR | 2852901 A1 | 10/2004 | |
|---|---|---|---|
| FR | 2979086 A1 | 2/2013 | |
| WO | WO-2008055806 A1 * | 5/2008 | ......... B60R 13/0838 |
| WO | 2018042094 A1 | 3/2018 | |

* cited by examiner (101)

(102)

(103)

(104)

ACOUSTIC SHIELD FOR MOTOR VEHICLE ENGINE

TECHNICAL FIELD

The disclosure concerns an acoustic protection screen for a motor vehicle engine, as well as an assembly comprising an engine provided with such a screen and a method for manufacturing such a screen.

BACKGROUND

The acoustic protection screens for motor vehicle engine are intended to cover the upper part of the engine. They fulfill several functions. A first function is their aesthetic function. They hide the engine from the view of users. A second function is their acoustic function. Indeed, a layer of acoustic absorbing material is generally integrated into said screens and makes it possible to attenuate the noise generated by the engine. A third function is their protection function. In particular, during a collision with a pedestrian, it may happen that the pedestrian head strikes the cowl in a zone located just above the screen. The screen thus makes it possible to protect the engine during the collision, but above all to cushion the collision and, therefore, to protect the pedestrian.

A known configuration of this type of screen has in particular been described in patent application WO 2018/042094. In this patent application, the protection screen is formed entirely of polyurethane foam. It is connected to the engine by an interlocking coupling device. This device consists of a stud and a mounting pin. The mounting pin is fixed to the top part of the engine so that it is oriented vertically and upwards. The protection screen includes a hollow stud on its inner face which fits onto the mounting pin and holds the screen in place.

Nonetheless, this type of screen has the disadvantage of being fragile due to their constituent material only of foam. Moreover, this foam material does not make it possible to ensure robust fixing of the hollow stud on the screen. Furthermore, it is generally difficult to affix an inscription or a layer of paint on this foam material: the aesthetics of the screen is therefore diminished.

Another known type of screen described in patent FR 2 979 086 combines the use of a frame made of plastic material surrounding a layer of acoustic absorbing material. Nonetheless, in this patent, the plastic material frame extending only to the periphery of the layer of acoustic absorbing material, it is always difficult to apply a decoration on the visible part of the screen. Furthermore, this type of screen requires the implementation of a relatively complex manufacturing method due to the non-homogeneous structure of the layer of acoustic absorbing material, which has two zones of different density.

SUMMARY

The present disclosure provides an acoustic protection screen that does not have the drawbacks of the prior art mentioned above.

For this purpose, the disclosure proposes an acoustic protection screen for a motor vehicle engine comprising:
  a first part made of a plastic material, said first part comprising means for fixing the screen to a motor vehicle engine,
  a second part consisting at least partially of an acoustic absorbing material, said second part being intended to come into contact with the engine,
  wherein the first part covers the second part so as to hide it at least partially and wherein the first part has a central opening serving as a housing for a third part, said third part being configured to absorb the shocks transmitted by the cowl of the motor vehicle during a pedestrian impact.

Thus configured, the protection screen of the disclosure has both increased rigidity, due to the use of a plastic material, and better flexibility, in particular at the level of a central upper zone, allowing it to absorb shocks more effectively during a pedestrian collision. It also has the advantage of being easy to perform.

The protection screen of the disclosure may also comprise one or more of the following characteristics:
  the second part is molded over the first part and the third part.
  the first part comprises two lateral flanges with a curved profile, each of the lateral flanges comprising a main segment adjoining the central opening and a first end segment adjoining the main segment and oriented perpendicular thereto, said first end segment forming a peripheral edge of the screen.
  each of the lateral flanges also comprises a second end oriented perpendicular to the main segment, said second end segment being configured to form a housing for a pin fixed to the engine, thus allowing the fixing of the screen to the engine.
  the second end segment has a substantially cylindrical shape.
  the first part is made of polyamide material.
  the second part is based on polyurethane foam.
  the polyurethane foam has a density comprised between 70 and 200 kg/m$^3$.
  the third part is made of fibrous material, in particular glass fibers.
  the fibrous material has a surface density comprised between 400 and 1000 g/m$^2$.
  the first part comprises lugs projecting at the central opening, said lugs being configured to hold the third part in position inside the central opening.

The disclosure also concerns an assembly comprising an engine provided with a screen as defined above, wherein the means for fixing the screen cooperate with complementary fixing means integral with the engine so as to ensure the fixing of said screen on said engine.

In a particular configuration of the disclosure, the means for fixing the screen comprise at least one stud having a housing intended to receive by interlocking a pin secured to the engine.

In another particular configuration of the disclosure, a hot part of the engine is covered by at least one end zone of the first part of the screen.

The disclosure also concerns a method for manufacturing an acoustic protection screen as defined above, said method comprising the following steps:
  a) Forming by plastic injection of the first part;
  b) Forming by thermocompression of the third part;
  c) Transferring the first part into a lower die of a mold;
  d) Positioning the third part inside the central opening of the first part;
  e) Casting an acoustic absorbing material into the lower die of the mold so as to cover the first part and the third part;

f) Closing the mold formed from the aforementioned lower die and an upper die having a geometry complementary to that of the second part;

g) Expanding the acoustic absorbing material so as to form the second part;

h) Unmolding the screen.

In a particular configuration of the disclosure, step e) is replaced by a step f'), succeeding step f) and carried out prior to step g), during which the acoustic absorbing material is injected in the mold formed by the lower and upper dies.

BRIEF DESCRIPTION OF THE DRAWINGS

The disclosure will be better understood on reading the following description, given solely by way of non-limiting example and made with reference to the drawings in which.

DETAILED DESCRIPTION OF THE DRAWINGS

Figure 1:
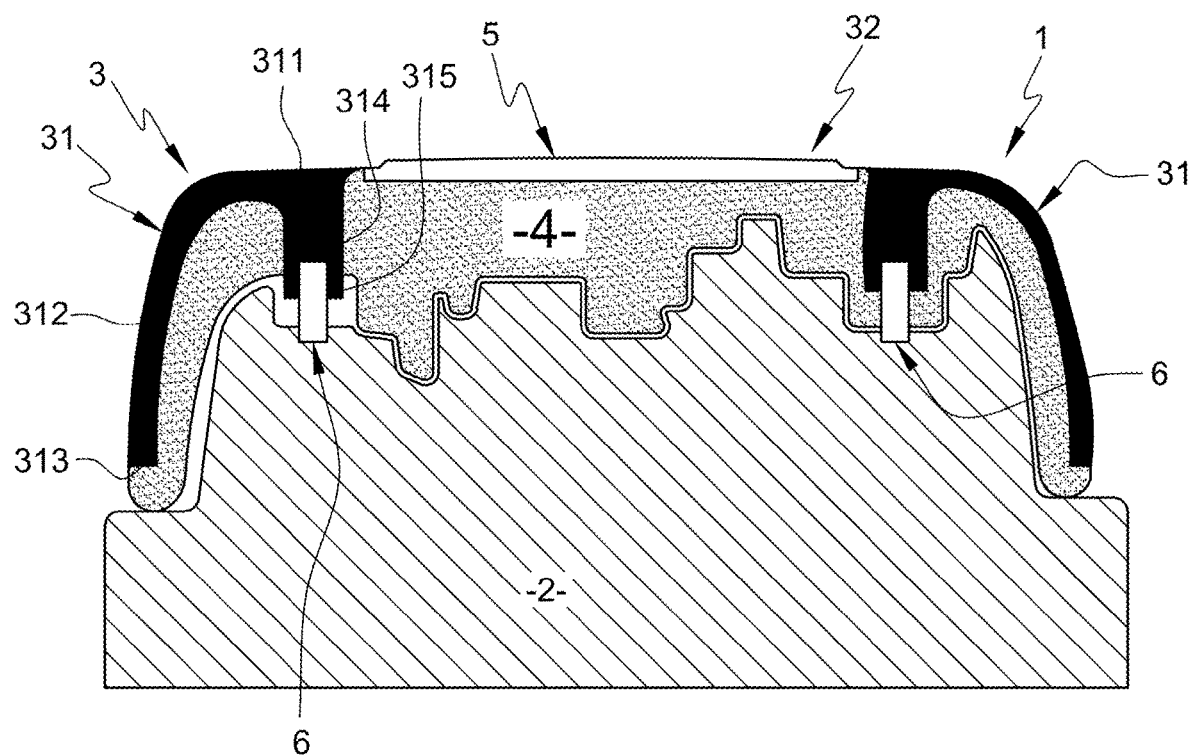
FIG. 1 is a schematic sectional view of an assembly comprising a motor provided with a protection screen according to an embodiment of the disclosure.
Figure 2A:
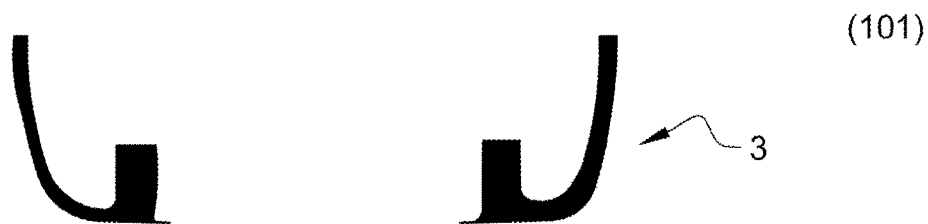
FIG. 2a schematically illustrates a first step of a manufacturing method making it possible to produce a protection screen according to the disclosure.
Figure 2B:
FIG. 2b schematically illustrates a second step of a manufacturing method making it possible to produce a protection screen according to the disclosure.
Figure 2C:
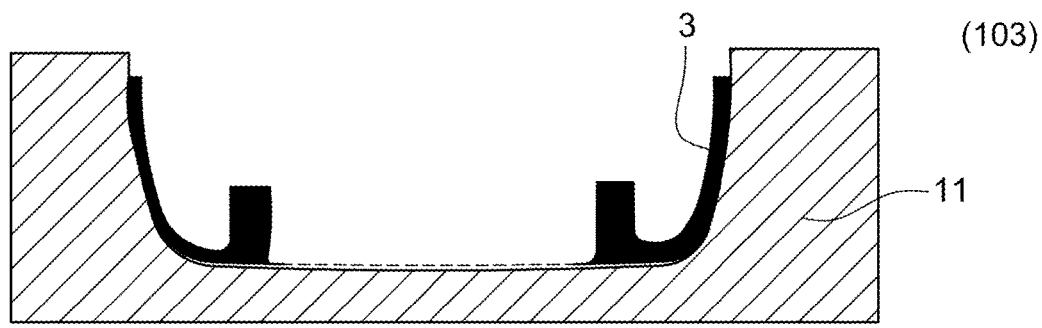
FIG. 2c schematically illustrates a third step of a manufacturing method making it possible to produce a protection screen according to the disclosure.
Figure 2D:
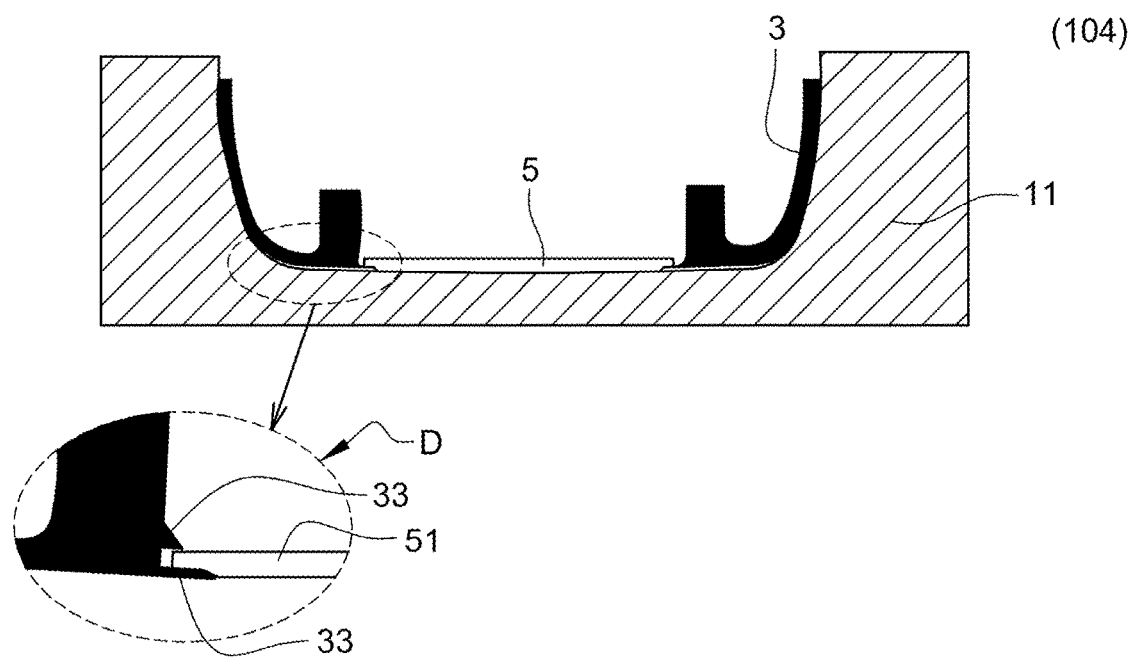
FIG. 2d schematically illustrates a fourth step of a manufacturing method making it possible to produce a protection screen according to the disclosure.
Figure 2E:
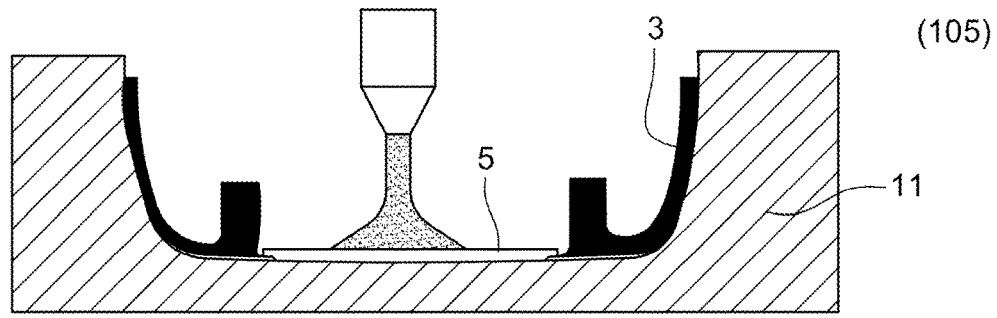
FIG. 2e schematically illustrates a fifth step of a manufacturing method for producing a protection screen according to the disclosure.
Figure 2F:
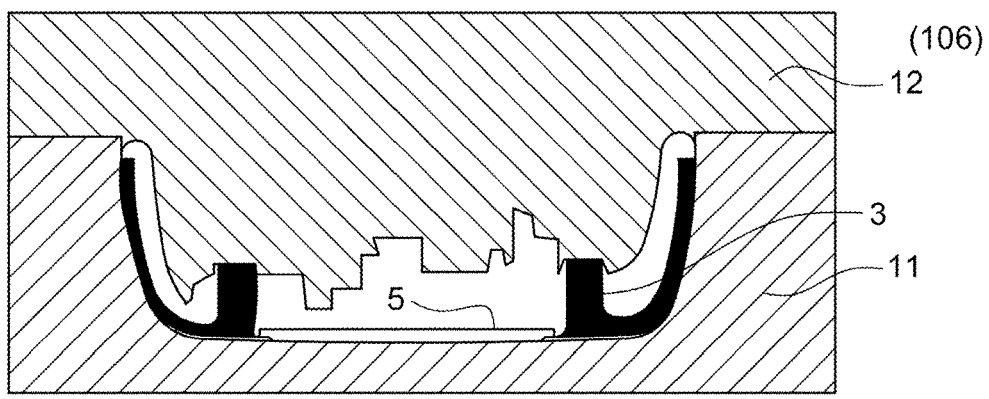
FIG. 2f schematically illustrates a sixth step of a manufacturing method making it possible to produce a protection screen according to the disclosure.
Figure 2G:
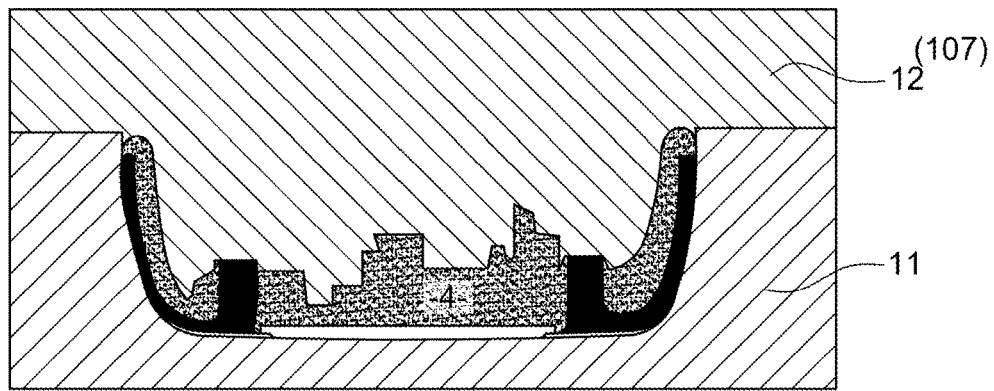
FIG. 2g schematically illustrates a seventh step of a manufacturing method making it possible to produce a protection screen according to the disclosure.
Figure 2H:
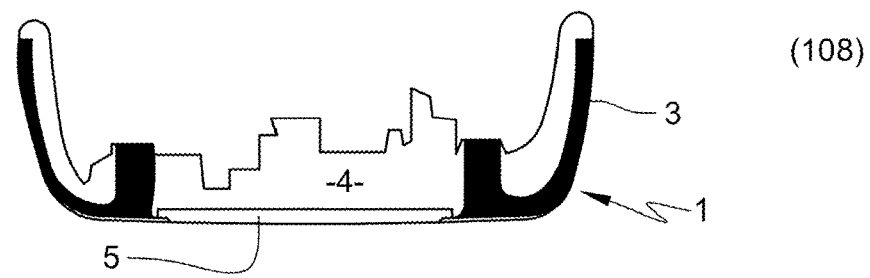
FIG. 2h schematically illustrates an eighth step of a manufacturing method making it possible to produce a protection screen according to the disclosure.

Referring to FIG. 1, an acoustic protection screen 1 is arranged on a motor vehicle engine 2 and under a cowl (not represented). The screen 1 comprises a first part 3 made of plastic material, in particular polyamide, and a second part 4 made of an acoustic absorbing material. The first part 3 covers the second part 4 so as to mask it at least partially. It further has a central opening 32 serving as a housing for a third part 5, said third part 5 being formed in a deformable material making it possible to effectively absorb the shocks transmitted by the cowl of the motor vehicle. Such a deformable material may in particular be a fibrous material, preferably based on glass fibers, with a surface density comprised between 400 and 1000 g/m$^2$.

The first part 3 comprises two lateral flanges 31 with a curved profile. Each of the lateral flanges 31 comprises a main segment 311 adjoining the central opening 32 and a first end segment 312 adjoining the main segment 311 and oriented perpendicular to the latter, said first end segment 312 forming a peripheral edge of the screen 1. At its free end 313, the end segment 312 adjoins, without touching it, the engine 2. The space separating the main segment 311 and the first end segment 312 of the engine 2 is entirely or almost entirely occupied by the second part 4. Each of the lateral flanges 31 also comprises a second end segment 314 oriented perpendicular to the main segment 311, said second end segment 314 having a substantially cylindrical shape and extending from the main segment 311 downwards in the direction of the engine 2. It crosses right through the second part 4. Its free end 315 is configured to form a housing for a pin 6 fixed on the engine 2, thus allowing the fixing of the screen 1 on the engine 2. In a particular configuration of the disclosure, said free end 315 will receive a hollow stud in which the pin 6 will be interlocked. In another particular configuration of the disclosure, the first part 3 may comprise at least one end zone intended to cover a hot part of the engine 2. This end zone could for example form an extension of one of the lateral flanges 31.

The second part 4 has on its lower face 41, which is in contact with the engine 2, a profile substantially complementary to that of the upper face of the engine 2. It occupies all or almost all of the space separating the first and third parts 3, 5 of the engine 2. It preferably consists of a polyurethane foam material with a density comprised between 70 and 200 kg/m$^3$.

Referring to FIGS. 2a to 2h, the different steps of a method for manufacturing a screen 1, in accordance to that illustrated in FIG. 1, are represented. This method comprises in particular:

a first step 101 during which the first part 3 is formed by plastic injection.

a second step 102 during which the third part 5 is formed by thermocompression.

a third step 103 during which the first part 3 is transferred into a lower die 11 of a mold.

a fourth step 104 during which the third part 5 is positioned inside the central opening 32 of the first part 3. As represented in detail D, this step can be facilitated in the case where the first part 3 has lugs 33 projecting at the level of the central opening 32, said lugs 33 being configured to house the lateral ends 51 of the third part 5 so as to hold said third part 5 in position inside the central opening 32. In a variant of the method, the steps 103 and 104 may be reversed.

a fifth step 105 during which an acoustic absorbing material is poured into the lower die 11 of the mold so as to cover the first part 3 and the third part 5.

a sixth step 106 during which the mold is closed, said mold being formed of the aforementioned lower die 11 and an upper die 12 having a geometry complementary to that of the engine 2.

a seventh step 107 during which the acoustic absorbing material expands, in particular under the effect of heat, so as to completely fill the free space inside the mold 10. The second part 4 is thus molded over the first part 3 and the third part 5.

an eighth step 108 during which the mold 10 is opened and the screen 1 thus formed is unmolded.

Other additional steps may be planned. In particular, the step 108 may be followed by a step consisting of assembling hollow studs at the free ends 315 of the second end segments 314 and/or a step of forming a decoration on the upper face of the screen 1.

Moreover, the sixth step 106 may be replaced by an intermediate step, carried out after step 107 and prior to step 108, during which the acoustic absorbing material is injected into the mold formed by the lower and upper dies 11, 12.

Figure 3:
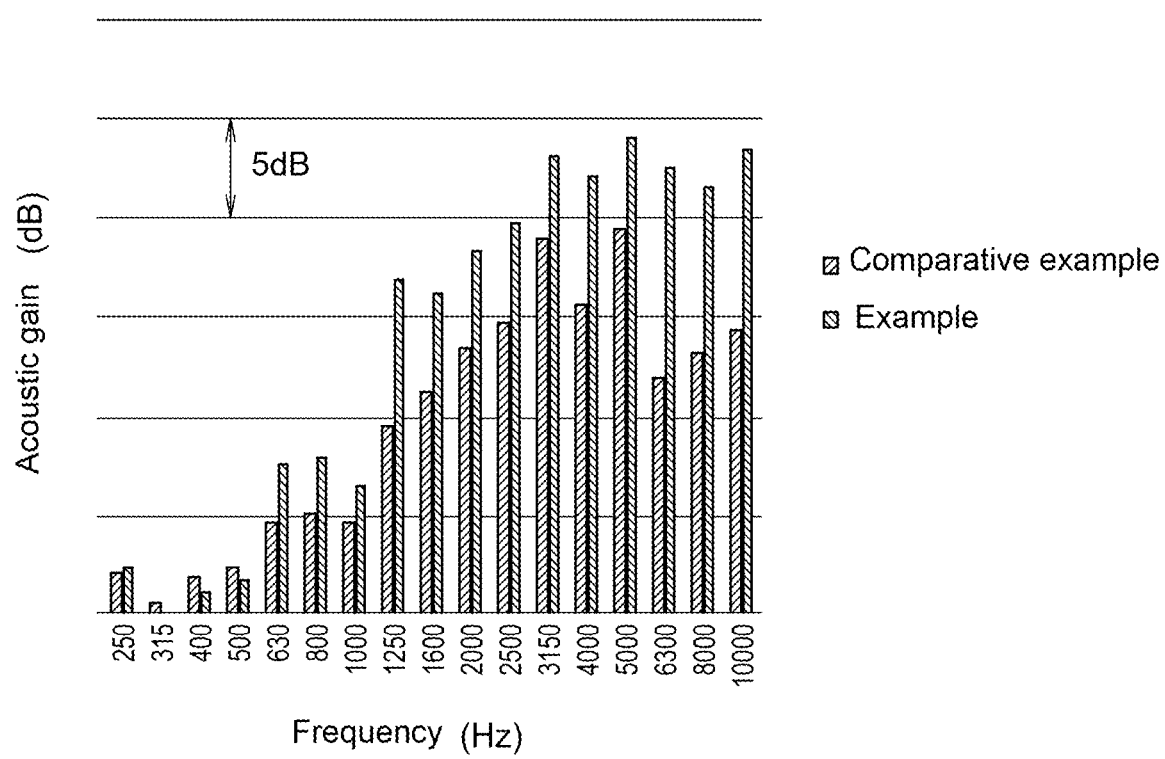
FIG. 3 is a diagram illustrating the variations in acoustic gain (expressed in dB) as a function of the frequency (expressed in Hz) of an acoustic wave passing through a protection screen according to the disclosure and, in comparison, those obtained when the same acoustic wave passes through a conventional protection screen.

Referring to FIG. 3, there is represented a diagram showing the variations of the acoustic gain (expressed in dB) as a function of the frequency (expressed in Hz) of an acoustic wave passing through a protection screen according to the disclosure (example 1) and, in comparison, those obtained when the same acoustic wave passes through a conventional protection screen (comparative example), formed of a plastic frame inside which is imprisoned an acoustic absorbing material based on fibers, such as described for example in the patent application FR 2 979 086. This diagram makes it possible in particular to observe that, in the frequency ranges comprised between 1600 and 8000 Hz, the acoustic gain of the screen according to the disclosure is at least 5 dB greater than that of the conventional screen. In the frequency ranges comprised between 630 and 1000 Hz, the acoustic gain of the screen according to the disclosure remains higher than that of the conventional screen but the difference between the two gains is, in this case, less than 5 dB. The protection screen of the disclosure therefore has the additional advantage of more effectively attenuating the noise generated by the engine.

The invention claimed is:

1. An acoustic protection screen for a motor vehicle engine comprising:
   a first part made of a plastic material, said first part comprising means for fixing the screen to a motor vehicle engine; and
   a second part comprising at least partially of an acoustic absorbing material, said second part being intended to come into contact with the engine,
wherein the first part covers the second part so as to hide the second part at least partially and wherein the first part has a central opening configured as a housing for a third part, said third part being formed in a deformable material configured to absorb shocks transmitted by the cowl of the motor vehicle during a pedestrian collision.

2. The screen according to claim 1, wherein the second part is molded over the first part and the third part.

3. The screen according to claim 1, wherein the first part comprises two lateral flanges with a curved profile, each of the lateral flanges comprising a main segment adjoining the central opening and a first end segment adjoining the main segment and oriented perpendicular thereto, said first end segment forming a peripheral edge of the screen.

4. The screen according to claim 3, wherein each of the lateral flanges also comprises a second end segment oriented perpendicular to the main segment, said second end segment being configured to form a housing for a pin fixed to the engine, thus allowing fixing of the screen to the engine.

5. The screen according to claim 4, wherein the second end segment has a substantially cylindrical shape.

6. The screen according to claim 1, wherein the first part is made of a polyamide material.

7. The screen according to claim 1, wherein the second part is based on polyurethane foam.

8. The screen according to claim 7, wherein the polyurethane foam has a density comprised between 70 kg/m$^3$ and 200 kg/m$^3$.

9. The screen according to claim 1, wherein the third part is made of fibrous material.

10. The screen according to claim 9, wherein the fibrous material has a surface density comprised between 400 g/m$^2$ and 1000 g/m$^2$.

11. The screen according to claim 1 wherein the first part comprises lugs projecting at the level of the central opening, said lugs being configured to hold the third part in position inside the central opening.

12. An assembly comprising an engine provided with a screen according to claim 1, wherein the means for fixing the screen cooperate with complementary fixing means integral with the engine configured to ensure the fixing of said screen on said engine.

13. The assembly according to claim 12, wherein the means for fixing the screen comprise at least one stud having a housing intended to receive by interlocking a pin secured to the engine.

14. The assembly according to claim 12, wherein a hot part of the engine is covered by at least one end zone of the first part of the screen.

15. A method for manufacturing a screen for acoustic protection according to claim 1, the method including the following steps:
   a) Forming by plastic injection of the first part;
   b) Forming by thermocompression of the third part;
   c) Transferring the first part into a lower die of a mold;
   d) Positioning the third part inside the central opening of the first part;
   e) Casting an acoustic absorbing material into the lower die of the mold configured to cover the first part and the third part;
   f) Closing the mold formed from the aforementioned lower die and an upper die having a geometry complementary to that of the second part;
   g) Expanding the acoustic absorbing material configured to form the second part; and
   h) Unmolding the screen.

16. The method according to claim 15, wherein step e) replaced by a step f'), succeeding step f) and carried out prior to step g), during which the acoustic absorbing material is injected into the mold formed by the lower and upper dies.

* * * * *